United States Patent [19]

Thorne

[11] Patent Number: 5,675,229
[45] Date of Patent: Oct. 7, 1997

[54] APPARATUS AND METHOD FOR ADJUSTING ROBOT POSITIONING

[75] Inventor: Henry F. Thorne, Pittsburgh, Pa.

[73] Assignee: ABB Robotics Inc., Auburn Hills, Mich.

[21] Appl. No.: 309,954

[22] Filed: Sep. 21, 1994

[51] Int. Cl.⁶ .......................................................... B25J 9/18
[52] U.S. Cl. ................... 318/568.11; 364/474.35; 901/1; 395/80; 318/568.1; 318/568.19; 318/568.25
[58] Field of Search .................................. 395/80, 88, 99; 364/474.35, 516, 568; 318/568.11, 568.12, 568.15, 568.19, 568.21, 568.25, 568.1, 568.13; 901/1, 2, 16, 3, 8, 9

[56] References Cited

U.S. PATENT DOCUMENTS

| | | | |
|---|---|---|---|
| 4,639,878 | 1/1987 | Day et al. | 364/516 X |
| 4,659,971 | 4/1987 | Suzuki et al. | 318/568 |
| 4,761,745 | 8/1988 | Kodaira | 318/568 X |
| 4,931,018 | 6/1990 | Herbst et al. | 364/474.35 X |
| 5,006,999 | 4/1991 | Kuno et al. | 318/568.15 X |
| 5,053,976 | 10/1991 | Nose et al. | 901/3 X |
| 5,129,010 | 7/1992 | Higuchi et al. | 364/474.35 X |
| 5,230,338 | 7/1993 | Allen et al. | 901/2 X |
| 5,341,458 | 8/1994 | Kaneko et al. | 395/80 |
| 5,353,355 | 10/1994 | Takagi et al. | 364/474.35 X |

OTHER PUBLICATIONS

*Appendix, CAP Operating Instructions Version 6*, ABB Trallfa Robot A/S, Publication T-5058 E, Oct., 1992.

Primary Examiner—Karen Masih
Attorney, Agent, or Firm—Harness, Dickey & Pierce, P.L.C.

[57] ABSTRACT

A robot control system for repositioning work points used by the robot control system at which operations occur. The work points are retrieved from the robot controller memory and plotted onto a video display for the operator to view. The operator then designates and selects a work point or work points which are to be repositioned. Using a mouse or other type of cursor control, the operator can then manipulate on the video display the points associated with the work points. After the operator has adjusted the position of the points, in the robot coordinate system, the revised points are then stored in the robot controller memory and used thereafter when positioning the robot.

19 Claims, 8 Drawing Sheets

APPARATUS AND METHOD FOR ADJUSTING ROBOT POSITIONING

This invention relates generally to robot positioning adjustment and, more particularly, to a control system for adjusting the position of robot work points by displaying the work points on a video display to facilitate the adjustment process.

BACKGROUND OF THE INVENTION

The use of robots to implement numerous manufacturing processes has increased dramatically in the last decade. Robots now perform various manufacturing operations such as deburring, grinding, polishing, painting, finish coating, cutting, welding, and others. A well adjusted robot enables enhanced control and repeatability of the manufacturing process. For the robot to function properly, the operator uses a teach pendant to initially teach the robot how and at what position or work point to perform operations and also to periodically adjust the positioning in order to maintain such accuracy. For example, in the case of using a robot to weld two stamped units together, position adjustment is necessary in order to compensate for changes in the stamping process which result in the position of the weld seam between the two pieces drifting. When such drift occurs, the weld positions which the robot was previously taught may no longer correspond to the actual weld seam. This requires robot adjustment to compensate for the drift of the weld seam.

Robot work points are presently adjusted by deactivating the robot and repositioning the work point using the teach pendant to step through the positioning program stored in the robot controller. Once the operator reaches the portion of the program controlling positioning of the work point, the position of the work point is readjusted, the new work point position stored, and the robot reactivated. Alternatively, the work point to be adjusted could be selected by referencing a particular line in the program listing corresponding to the particular work point position to be adjusted. This requires obtaining the program listing, searching through what is often a substantially large program listing, locating the line number corresponding to the weld position, and changing the coordinates to adjust the work point position. Such adjustment typically requires that a highly skilled robot operator engage in this detailed process to adjust the robot positioning. This process results in excessive robot down time and extensive operator training and labor.

Thus, there is a need for a robot position adjustment control system which enables fast, simple adjustment of robot positions and which operators of varying skills and technical abilities can use.

SUMMARY OF THE INVENTION

This invention is directed to a control system for adjusting a robot arm positionable at a point in a coordinate system from an initial position to a desired position. The control system has a memory for storing the point, and the point is retrieved from the memory and displayed on a video display at its initial position. Once displayed at its initial position, a pointer is moved within the video display to indicate the point at the initial position. A selector then selects the point indicated by the pointer, and a position adjustor is manipulated to displace the selected point on the video display from the initial position to the desired position. A position adjustment controller then determines the displacement of the selected point and calculates a coordinate for the desired point.

From the subsequent detailed description taken in conjunction with the accompanying drawings and subjoined claims, other objects and advantages of the present invention will become apparent to those skilled in the art.

DETAILED DESCRIPTION OF THE PREFERRED EMBODIMENT

Figure 1:
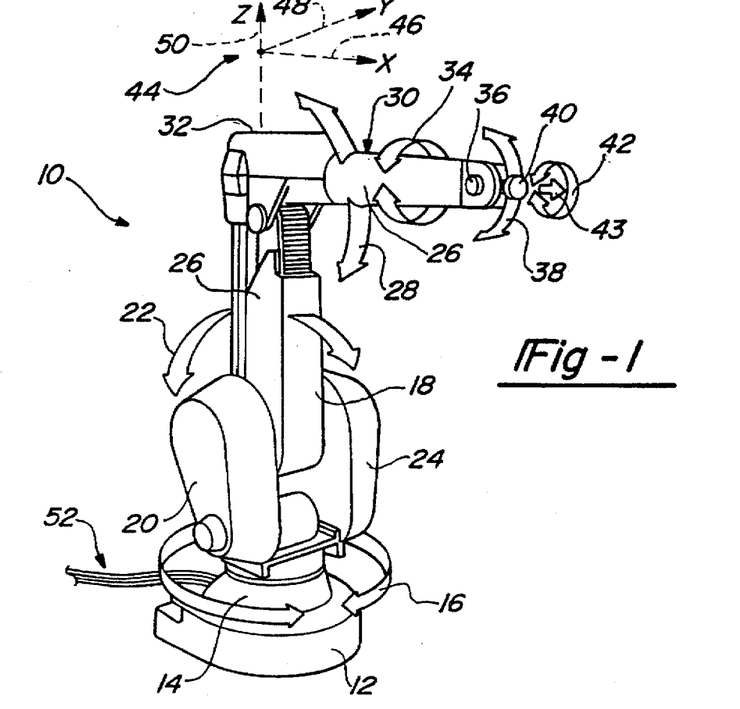
FIG. 1 depicts the mechanical unit of a robot which may be positioned in accordance with the principles of the present invention.

FIG. 1 depicts the mechanical unit 10 of a robot whose positioning may be modified according to the principles of the present invention. The mechanical unit 10 includes a base 12 which is suitably secured to a foundation (not shown) in order to limit movement. A gear box and motor unit 14 attaches to the base 12 and enables rotational movement in the direction of arrows 16. A lower arm 18 attaches to a gear box and motor unit 20 which controls translational movement in the direction of arrows 22. A third motor unit and gear box 24 attaches opposite the robot lower arm 18 from motor unit and second gear box 20. Third motor unit and gear box 24 controls extension of lower arm 18 in the direction of arrows 28. Lower arm unit 18 connects to upper arm unit 30 via fourth motor unit and gear box 32. Rotational movement of upper arm unit 30 in the direction of arrows 34 is controlled by fourth motor unit and gear box 32. Upper arm unit 30 also connects to wrist 36 which is positionable in a swivel movement in the direction of arrows 38 and rotational movement of mounting flange 40 in the direction of arrows 42. Motor unit and gear box 26 controls the swivel movement of wrist 36 in the direction of arrows 38 and rotational movement in the direction of arrows 42. A work tool 43 mounts to mounting flange 40. Work tool 43 varies in accordance with the particular operation to be effected by the robot. By way of example, the work tool may deburr, grind, polish, paint, cut, weld, or perform other operations.

The mechanical unit 10 described herein is generally called an anthropomorphic robot. However, the principles of this invention generally apply to any of a number of mechanical units including cartesian, cylindrical, polar, and gantry mechanical units. The mechanical unit 10 of FIG. 1 is positioned within a selectable coordinate system 44, for example, having an x-axis 46 and y-axis 48 and a z-axis 50. The coordinate system is variable and selectable within any of a number of coordinate systems known in the art.

The robot mechanical unit 10 is adjustable through the motor unit and gear boxes 14, 20, 24, 26, and 32. The motor units gear boxes 14, 20, 24, 26, and 32 described herein are typically servo-controlled motors which, as will be appreciated in the art, operate to control movement in steps. Alternatively, it will be understood that hydraulic or pneumatic control is equally applicable for manipulating mechanical unit 10. The electrical control signals for actuating the motor units to effect movement of the mechanical unit 10 through the gear boxes are supplied on control lines 52 from a robot control unit 54 shown in FIG. 2.

Figure 2:
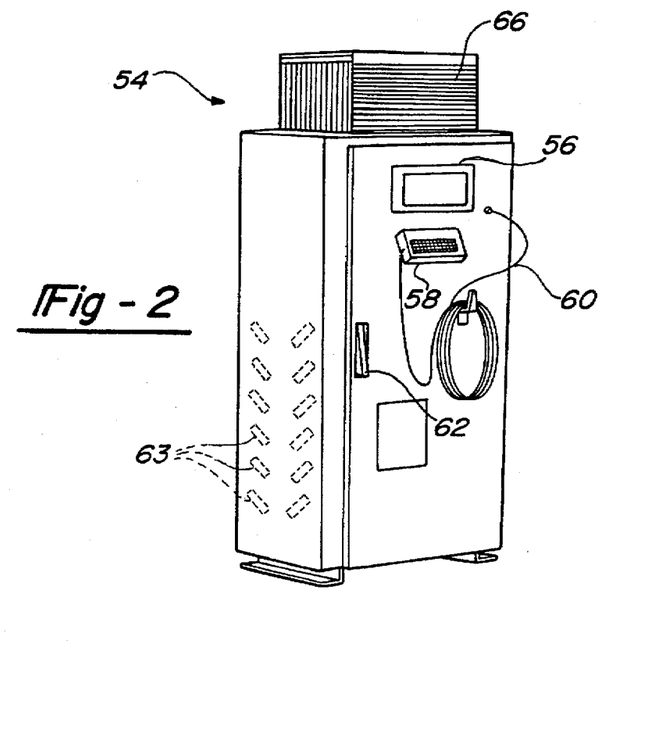
FIG. 2 depicts a robot control unit which monitors the position of and generates control signals to manipulate the mechanical unit depicted in FIG. 1.

The control unit 54 typically includes a video display 56 on which relevant data, operator programming information, and alarms may be displayed. Display 56 typically connects to a computer 66, shown in FIG. 3, which in turn connects to a robot controller 64 (also described in FIG. 3) which generates specific commands to manipulate mechanical unit 10. Control unit 54 also includes a teach pendant 58 which interfaces with robot controller 64 via interconnection line 60. A floppy disc unit 62 connects to computer 66 and enables transfer of data stored on diskette for downloading to computer 66 or the robot controller 64. Various connections may be made to the control unit 54 via connectors 63, such as control lines 52. Control unit 54 also typically includes a cooling device 66 which maintains the internal components of control unit 54 at a safe operating temperature, thereby providing an suitable environment in which the electronic devices may function.

Figure 3:
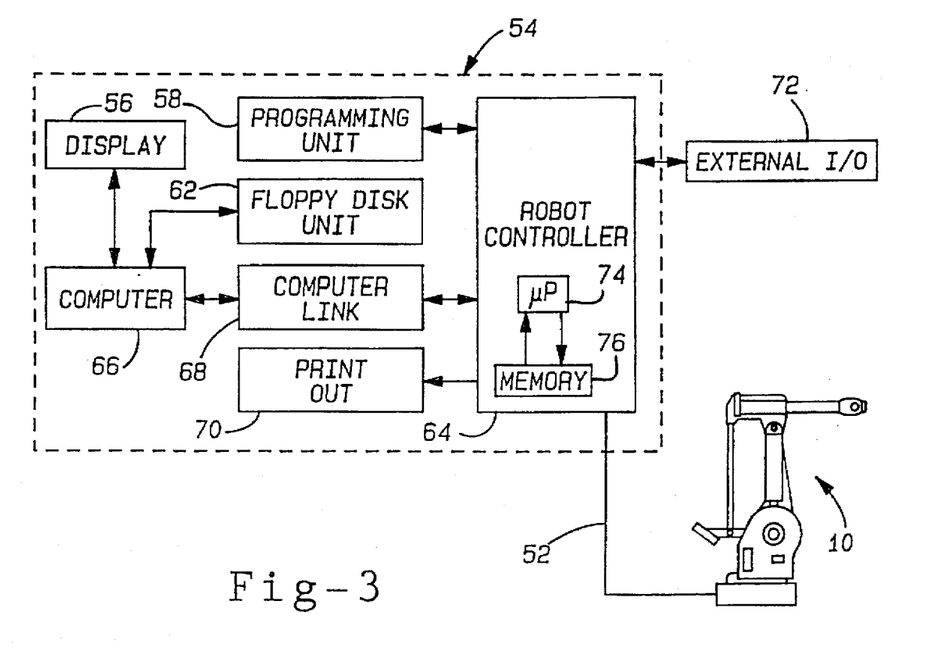
FIG. 3 depicts a partial block diagram of the control unit shown in FIG. 2.

Referring to FIG. 3, the interconnection between control unit 54 and mechanical unit 10 is shown. As described with respect to FIG. 1, control signals between control unit 54 and mechanical unit 10 are relayed on control lines 52. Internal to control unit 54, a robot controller 64 generates the control signals directing actuation of motor units and gear boxes 14, 20, 24, 26, and 32 to manipulate mechanical unit 10 of the robot. Attached to robot controller 64 is teach pendant 58 of FIG. 2, which is used in the initial programming and setup and later adjustment of mechanical unit 10. Also connected to robot controller 64 is computer 66 which interfaces to robot controller 64 via computer link 68. A floppy disk unit 62 may interface with robot controller 64 through computer 66. Optionally, floppy disk unit 62 may interface directly with robot controller 64. Robot controller 64 may optionally output information to print device 70. Robot controller 64 may also receive information externally from the external I/O device 72. As shown in FIG. 3, robot controller 64 includes a microprocessor 74 and a memory unit 76 communicating therewith. Memory unit 76 typically stores robot positions which microprocessor 74 retrieves and in order to generate control signals to direct movement of mechanical unit 10.

Figure 4:
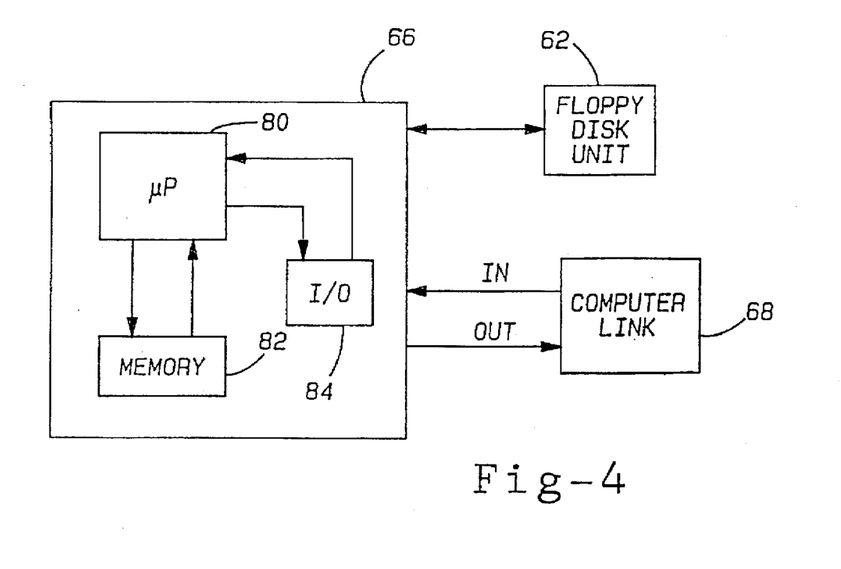
FIG. 4 depicts a block diagram of the control unit computer depicted in FIG. 3.

FIG. 4 is a block diagram of computer 66. Computer 66 includes a microprocessor 80 which communicates with memory 82 and with and I/O device 84. Typically, the I/O device 84 interfaces with computer link 68 (also of FIG. 3) via communication lines IN and OUT. Microprocessor 80 may be any of a number of microprocessors well known in the art. More particularly, computer 66 may typically be any of a number of known IBM compatible personal computers, as are also well known in the art.

In operation, work tool 43 of FIG. 1 mounts to mounting flange 40 of mechanical unit 10. During initial start up and calibration, movement of the mechanical unit 10 is programmed via teach pendant 58. During programming, an operator steps the mechanical unit 10 and control unit 54 through the range of movements which must be executed in order to carry out the desired function. The operator programs control unit 54 to generate control signals which activate the motor units and gear boxes which in turn manipulate mechanical unit 10 to the desired position. In general, mechanical unit 10 translates through numerous of positions as directed by the operator. These positions include work points and intermediate positions. At a work point, the robot performs a particular operation such as those mentioned above. Between the designated work points, several intermediate points exist and define a path which the mechanical unit follows to arrive at the next work point. Robot controller 64 stores the entirety of the work points and the intermediate points in memory 76. The work points in memory 76 are stored in special memory locations called registers. For example, if the mechanical unit 10 were used to weld body seams on a vehicle assembly line, work tool 43 would be a welding tool. An operator would operate the teach pendant 58 to control movement of mechanical unit 10 so that the work tool 43 may be positioned where a weld is to occur. Once the work tool 43 is positioned at the weld position, the operator programs the weld using specific commands available through the teach pendant 58 to activate work tool 43. The positions at which welds occur are referred to as work points and are stored in register memory, and the positions through which the work tool passes in transition to other work points are intermediate points and are stored in regular memory.

Figure 5:
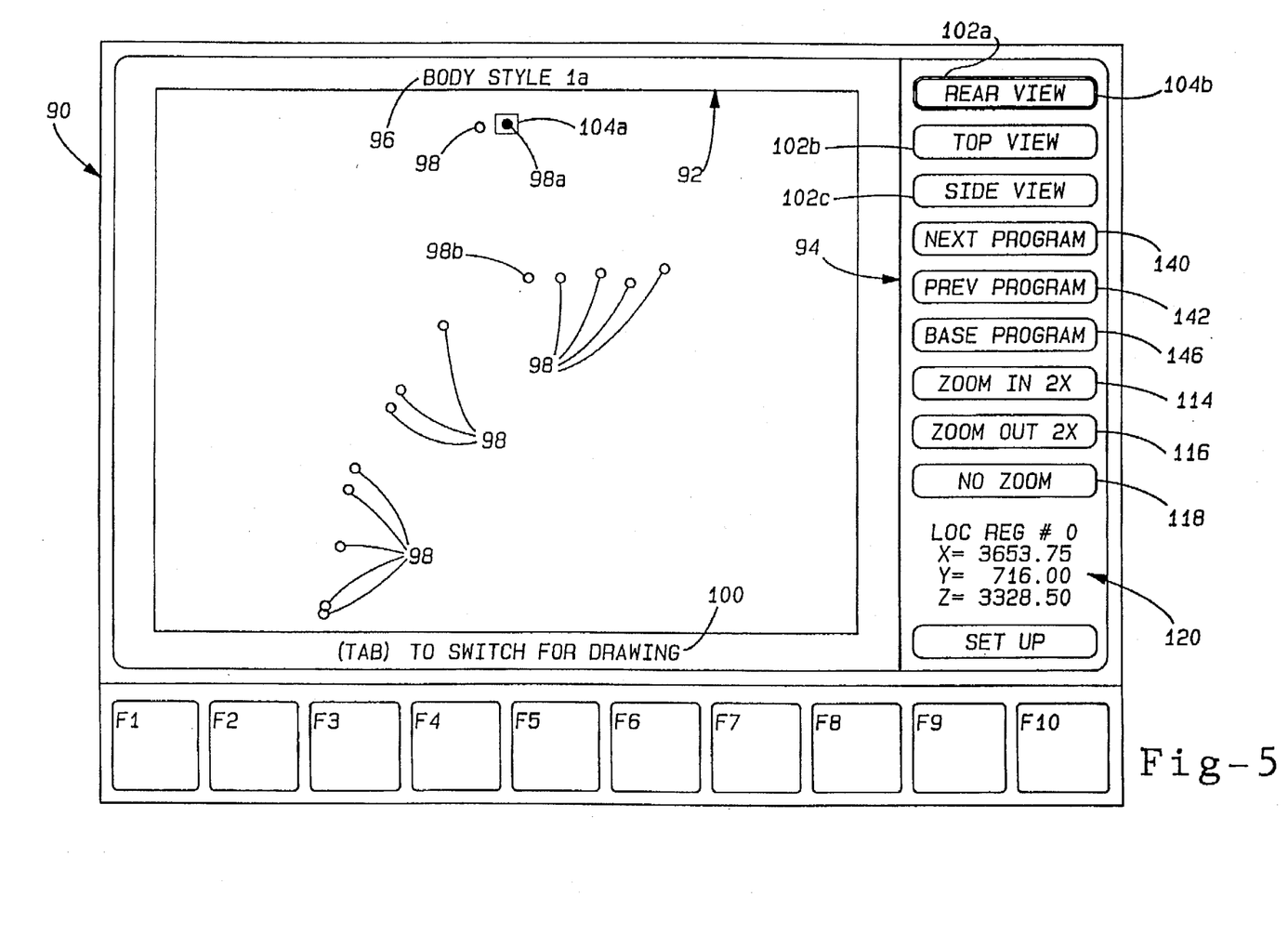
FIG. 5 depicts a typical work point screen displayable on the video display of the control unit of FIG. 2.

In order to adjust a work position, according to the principles of this invention, the microprocessor 80 of computer 66 retrieves from the register portion of memory 76 of robot controller 64 a range of points (the selection of which will be described further herein). For each point in the range, three values are associated therewith. These values define the x, y, and z coordinates of the work points stored in the retrieved registers. When microprocessor 80 retrieves the range of points from the register portion of memory 76 of robot controller 64, microprocessor 80 generates a screen for display on video display 56. In FIG. 5, view screen 90 represents a screen typically displayed on video display 56 and introduces several key features of this invention. The view screen 90 has a point viewing area 92 and a control section 94. Within the point viewing area 92 is a title area 96, to be described further herein, and several points 98. Note that when referring to the points generally, all of the points will be referred to using reference numeral 98 or a subscript thereof. Further, note that all points 98 of FIG. 5 are substantially interchangeable for the purposes of this invention, and points 98a and 98b are selected strictly to demonstrate particular aspects of this invention. At the bottom of the view screen 92 is a message line 100. Along the bottom of the display 90 are control buttons F1 through F10. Function buttons F1–F10 enable the selection of specific program functions such as help, display faults, status, machine statistics, input pin information, output pin information, mode selection, maintenance mode, manual cycle, and adjustment, respectively. Note that button F10, the adjust button, selects the work point position adjustment mode described herein.

Points 98 displayed in point viewing area 92, correspond to work points stored in register memory 76 of robot controller 64. On the particular screen 90 of FIG. 5, for example, the points 98 correspond to weld positions along a wheel-well weld seam. However, note that points 98 vary in number and represent any of a variety of possible configurations. The configuration of points 98 in point viewing area 92, depends upon the particular view selected by one of the view selection buttons 102a, 102b, or 102c. The configuration of points 98 corresponds to a rear view of the exemplary wheel-well weld seam and is displayed by selecting REAR VIEW button 102a. This view corresponds to a view from behind the mechanical unit 10 in the direction of the components work piece (not shown). When viewing the configuration of points 98 from the rear view and assuming the coordinate system 44 as depicted in FIG. 1, the work points are adjustable in the y and z planes. When viewing the points 98 from the top view, the work points 98 are adjustable in the x and y planes. When viewing the points from a side view, the work points are adjustable in the x and z plane.

Also shown in FIG. 5 is a cursor 104b which designates the REAR VIEW selection button 102a. This cursor is optionally displayed in a different color so that it is further highlighted. The cursor 104b may be manipulated by using the arrow keys or a mouse (not shown). Throughout this specification, the cursor will be assumed to be manipulated by arrow keys. If the cursor lies in the control panel 94, when a left arrow key is depressed, the cursor moves to a point 98 in the point viewing display 92 in accordance with a predetermined arbitration scheme. For example, if the cursor 104b highlights REAR VIEW selection button 102a and the left arrow key is pressed, the cursor may then designate point 98a as depicted at 104a. Additional presses of the arrow keys manipulate the cursor between points 98 or between a point 98 in the point viewing display 92 and the control panel 94. When the cursor 104a designates a point, it may optionally assume a different color than when designating a control button. Note that only one cursor appears on the screen at one time. Further, when the cursor 104b appears in control block 94, the point 98a previously designated by cursor 104b in FIG. 5 appears as a darkened circle. If the operator presses the TAB key when the cursor designates a button in control block 94, the cursor switches back to designate point 98a as shown with cursor 104a. Screen 90 also includes a message line 100. When cursor 104b highlights a control button, the message in the message line reads "<TAB> to switch to drawing". However, when cursor 104a highlights a point 98, message line 100 reads "<TAB> to switch to button on right, <ENTER> to adjust, <,> toggle range" (not shown).

Figure 6:
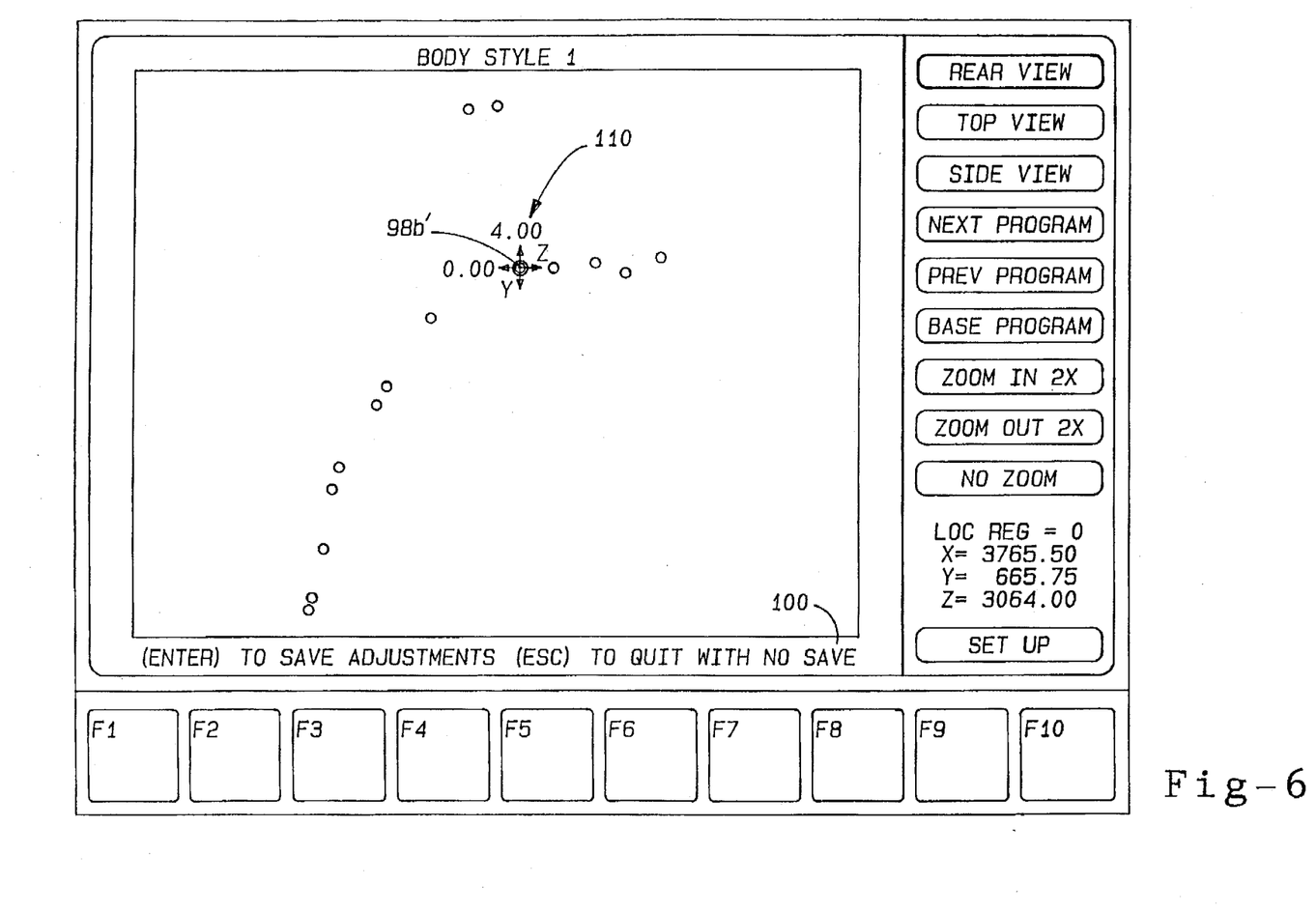
FIG. 6 depicts a typical work point adjustment screen displayable on the video display of the control unit of FIG. 2.

When the operator desires to adjust the position of a point 98, the operator manipulates the cursor using the arrow keys to designate or highlight the point 98 which the operator desires to reposition. For example, assume that the operator wants to manipulate point 98b, the operator uses the LEFT, RIGHT, UP, or DOWN arrow keys to position the cursor 104a on point 98b. In accordance with the instructions which would be displayed in message line 100 (not shown in FIG. 5), the operator then presses the ENTER key to select the point and toggle the appearance of point 98b' to appear as point 98b as shown in FIG. 6. A coordinate system then appears around work point 98b'. In this particular example, because the rear view has been selected, the point 98b' is adjustable in the y and z planes. In order to manipulate the point 98b', the operator presses the UP, DOWN, LEFT, or RIGHT arrow keys in accordance with the desired repositioning of point 98b'. In FIG. 6, for example, if the operator desires to move point 98b' upwardly along the z-axis, the operator presses the UP arrow key in order to manipulate the point 98b' in that direction. When the operator manipulates point 98b' in a particular direction, a value 110 appears in the direction in which the point 98b' will be displaced in the real coordinate system. The value 110 represents the displacement in millimeters of the designated points in the coordinate system of mechanical unit 10. In FIG. 6, point 98b' is shown as displaced in an upward direction by four millimeters. Typically one press of an arrow key corresponds to a displacement of one millimeter; however, limitations may be placed on the total displacement of the points 98. After the operator has repositioned the point 98b', the operator then presses ENTER to save the adjustments. If the operator no longer desires to adjust the particular point 98b', the operator then presses escape (ESC) to leave the point adjustment mode and return to the point designation mode. These instructions are provided on message line 100 as shown in FIG. 6.

Figure 7:
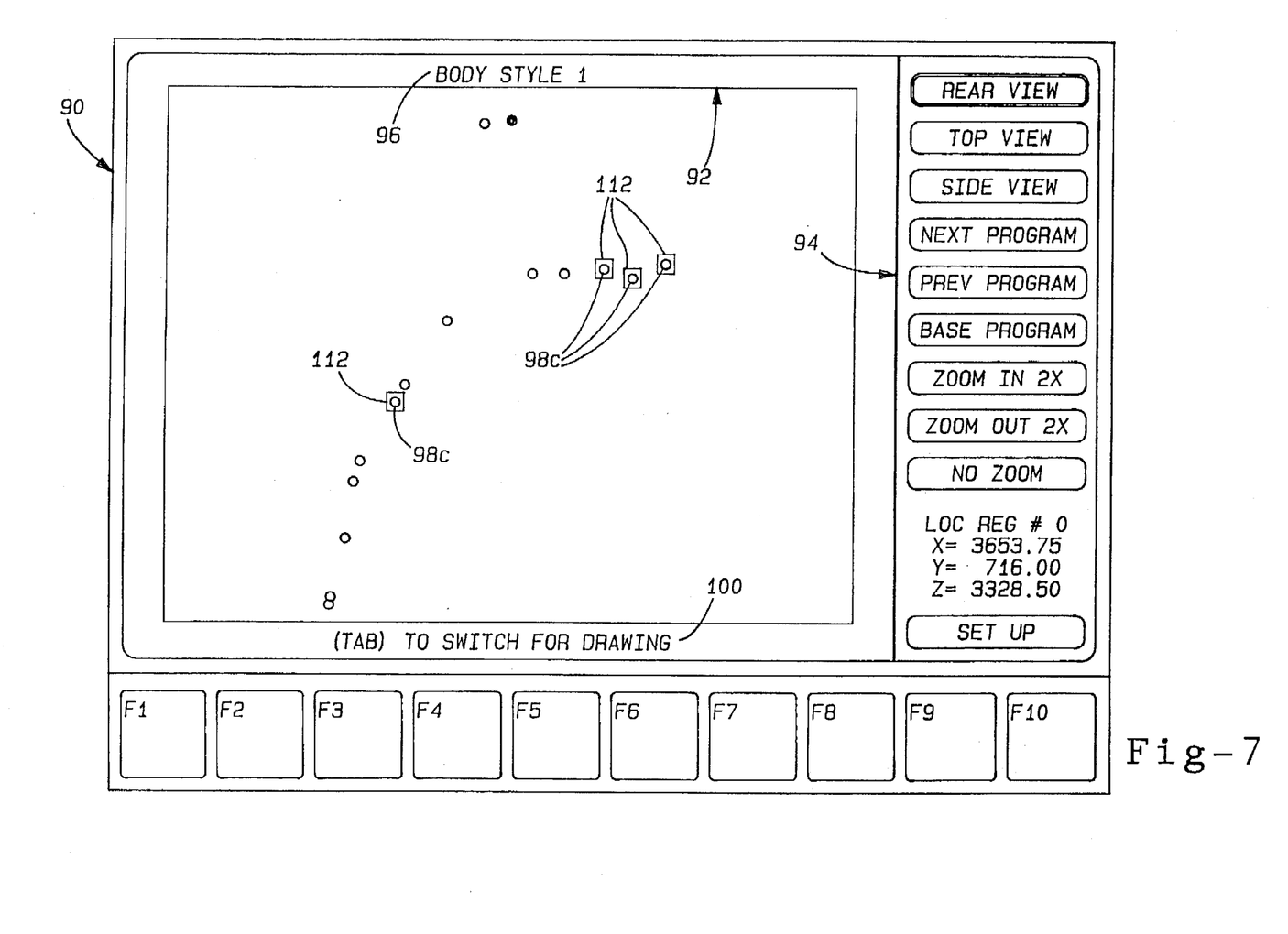
FIG. 7 depicts a typical multiple work point selection screen displayable on the video display of the control unit of FIG. 2.

Referring to FIG. 7, an additional feature of this invention will be described. Note that FIG. 7 has several elements which are identical to those depicted in FIG. 5 and similar elements are referenced using like reference numerals. FIG. 7 depicts the selection of a range of points as compared to the selection of a single point for adjustment. If the operator determines that several points 98 should be shifted in the same direction, the operator can select the particular points to be shifted and move them at one time. For example, if the operator desires to adjust the position of points 98c of FIG. 7, the operator would select one of the points 98c and press a PERIOD (.) key. Pressing PERIOD selects the designated point 98c and highlights that point with cursor 112. The operator then uses the arrow keys to move to other points 98c which the operator desires to designate and select and will similarly press the PERIOD key to designate those points. Those designated points are also similarly highlighted by a cursor 112. Rather than designating selected points with a cursor 112, optionally, the selected points 98c may be designated using a different color on the screen. After the points have been designated, the operator then presses the ENTER key and all of the selected points can be moved similarly as described with respect to FIG. 6.

Referring once again to FIG. 5, control panel 94 also includes buttons which enable a zoom capability. When ZOOM IN button 114 is designated by cursor 104b and the ENTER key is pressed, the point 98 which was designated by cursor 104a previously to positioning the cursor 104b to control panel 94 and the area around that button are magnified by a factor of two. Similarly, when ZOOM OUT button 116 is designated with cursor 104a, the area around the point 98 which was designated by cursor 104a before moving the cursor the control panel 94 is demagnified by a factor of two. If the operator desires to return to a standard scale the operator merely designates NO ZOOM button 118 and presses the ENTER key. Selecting and activating NO ZOOM button 118 returns the screen to the standard scale as chosen when points 98 are initially displayed on viewing area 92. Another feature available in control panel 94 is point specific data 120 which provides specific coordinate information for the point 98 designated by the cursor 104a.

Figure 8:
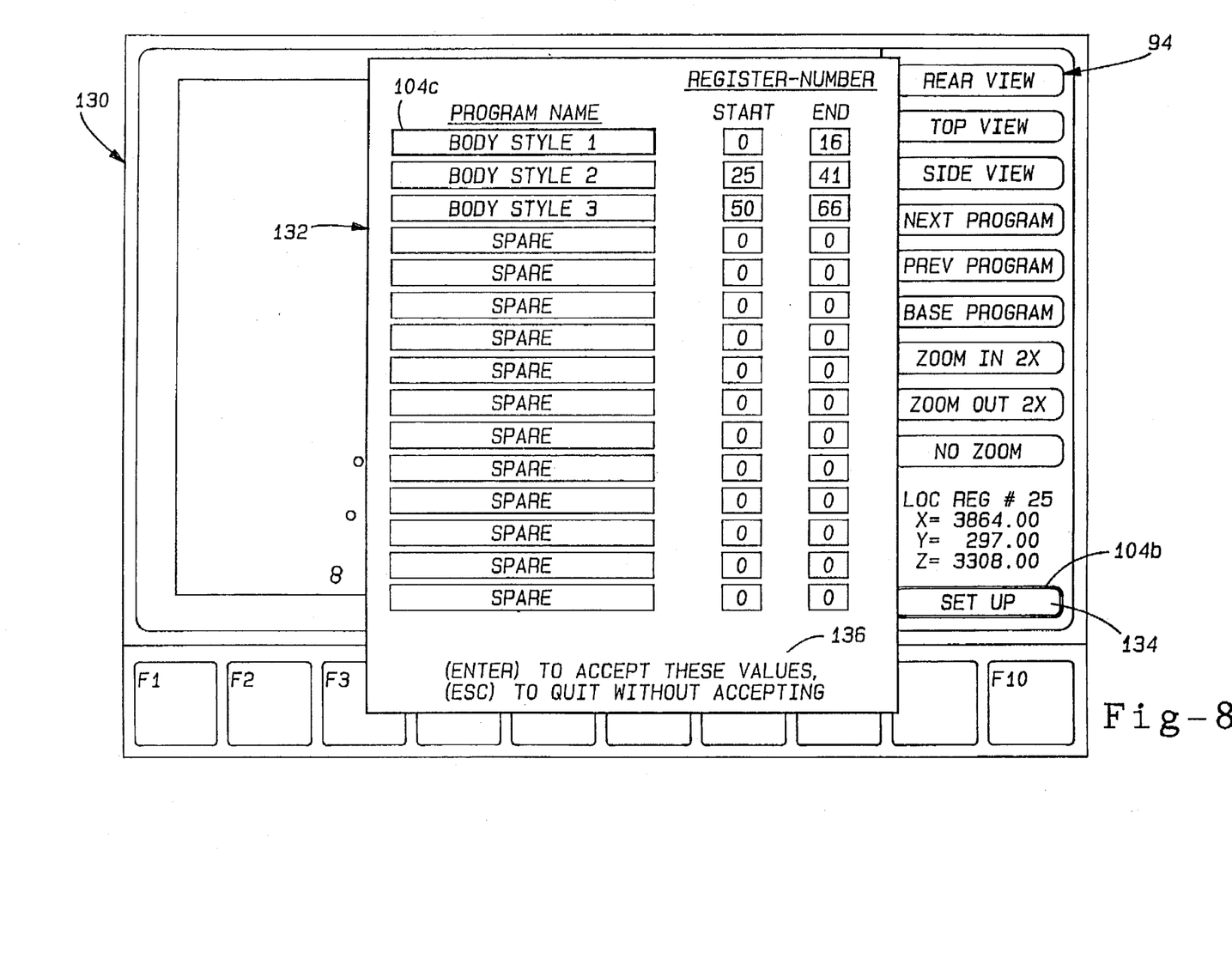
FIG. 8 depicts a typical setup screen displayable on the video display of the control unit of FIG. 2.

FIG. 8 depicts a setup screen 130 which enables the operator to group registers stored in the robot controller memory 76 related to one particular part. With the ever-increasing flexibility demanded on assembly lines, robots must be designed to adaptively adjust to perform a given operation on more than one component. For example, a robot which welds body panels for trucks on a vehicle assembly line preferably adapts to weld body panels for extended cab versions of the same body style. This desired flexibility requires that robot controller 64 (shown in FIG. 3) generate control signals to operate on more than one set of predetermined points. Thus, the work points at which a robot performs specific operations vary in accordance with the particular part on which the operation is performed. The present invention also enables the adjustment of the positioning of work points for a variety of parts on which it operates.

As described with respect to FIG. 3, robot controller 64 includes a memory 76. Memory 76 stores in registers numerous points to which the robot moves in carving out a path while performing its operations. Microprocessor 74 retrieves the locations from memory 76 and directs movement of the mechanical unit 10 by generating control signals transferred on line 52. While manipulating mechanical unit 10 typically requires storage of hundreds or even thousands of points in memory 76, there exists particular points at which mechanical unit 10 executes specific operations such as welding, grinding, gluing, deburring, cutting, etc. Even though several hundred or thousand points are stored in memory, there may only be 20 to 40 work points stored in registers which the operator may read and modify. The registers in which work points are stored define the specific coordinate location at which an operation is to occur. In keeping with the example of a welding robot, each register would define a particular position at which a weld occurs.

Referring again to FIG. 8, screen 130 includes control panel 94 and a setup menu 132. Setup menu 132 is activated by designating the SETUP button 134 by using cursor 104b to designate the SETUP button 134 and selecting the button before pressing ENTER. Setup menu 132 includes a message line 136 in which instructions may be displayed. After setup menu 132 is displayed, cursor 104c appears under the column entitled PROGRAM NAME. The block designated by cursor 104c display the label BODY STYLE 1. BODY STYLE 1 defines a specific body style on which the robot operates. Below the label BODY STYLE 1, other program names such as BODY STYLE 2 and BODY STYLE 3 identify other user selectable body styles. To the right of the program names are two columns both headed by the title REGISTER NUMBER and initially sub-headed by the titles START or END. The numbers appearing below the START and END labels refer to the range of registers retrieved when the operator desires to adjust the work point positions of that particular body style. For example, if registers 25 through 41 in memory 76 store specific coordinates corresponding to BODY STYLE 2, the operator enters that information into the START and END columns in the same row as BODY STYLE 2. After the user has associated a particular body style with a particular range of registers, the user then presses ENTER to save these settings.

In operation, when the user desires to adjust the position of work points corresponding to BODY STYLE 2, the user selects this body style by designating it with cursor 104c and selects the body style by pressing ENTER. The user then inputs registers 25 in the START column and 41 in the END column. The coordinate values stored in those registers are retrieved when adjusting the positions of work points. After the user has associated a particular body style with a particular range of registers, the user then hits ENTER to save these groupings.

Referring to FIG. 5, title line 96 displays the particular body style selected by the operator. If the operator desires to select other body styles, the operator highlights the NEXT PROGRAM button 140 or the PREVIOUS PROGRAM button 142 to select the desired body style. The selected body style title appears in title line 96, and the work points corresponding to the selected body style appear in viewing area 92 in the view as selected using view selection buttons 102a–c. Note that the first body style listed in FIG. 8 is also referred to as the base program. When the user desires to select the base program, the operator need not step through the NEXT PROGRAM 140 or PREVIOUS PROGRAM 142 buttons. Rather, the operator need only designate and activate BASE PROGRAM button 146.

Figure 9:
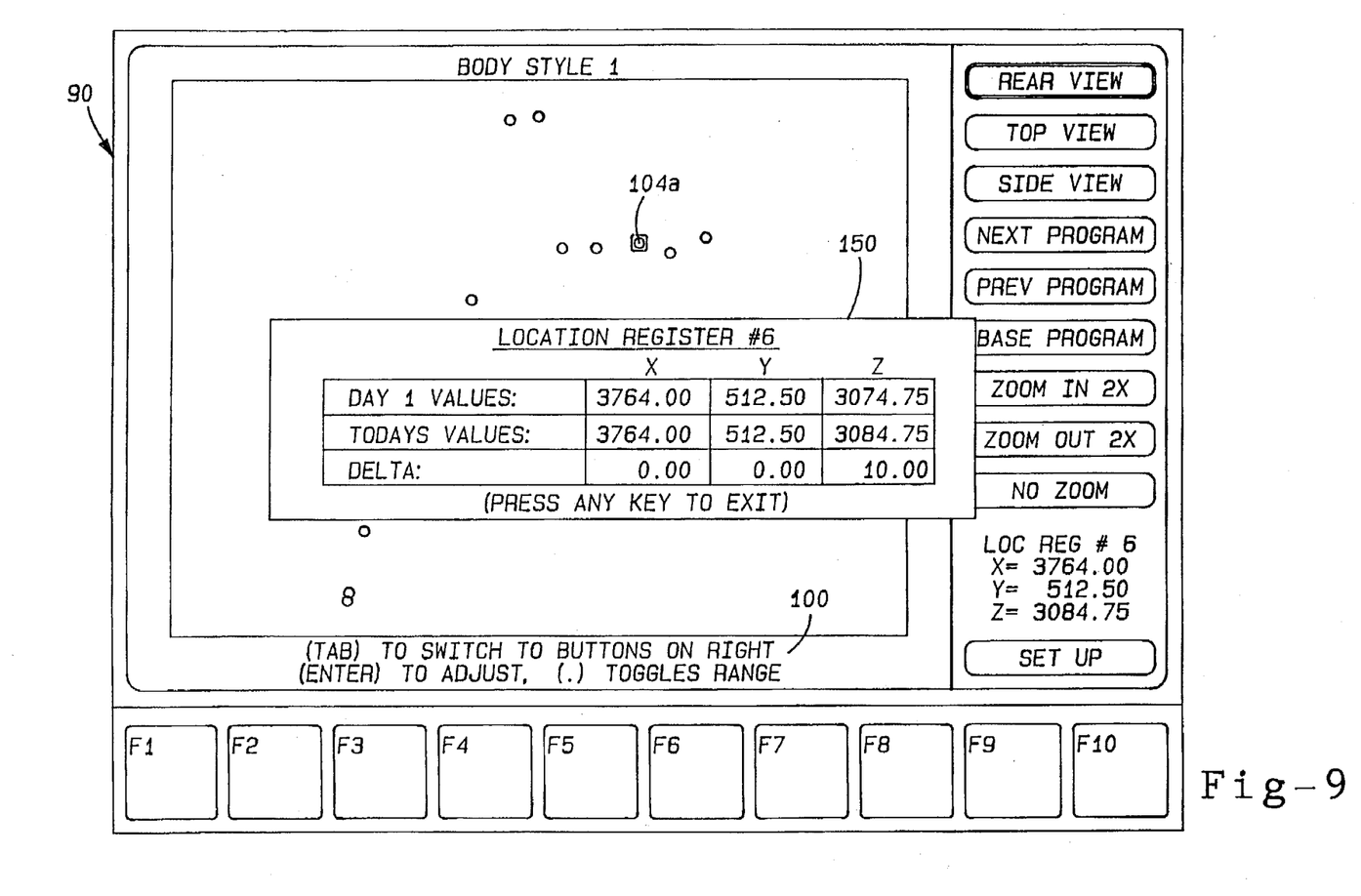
FIG. 9 depicts a typical help screen displayable on the video display of the control unit of FIG. 2.

FIG. 9 displays an additional feature of this invention. If the user designates a particular work point 98 using the cursor 104a, and activates function key F10, an information screen 150 provides information for the selected point. The help screen provides information on the initial coordinates, the final coordinates, and the difference between the initial and final coordinates. The help screen 150 also displays the particular register in which is stored the coordinate information for the selected point designated by cursor 104a.

Figure 10:
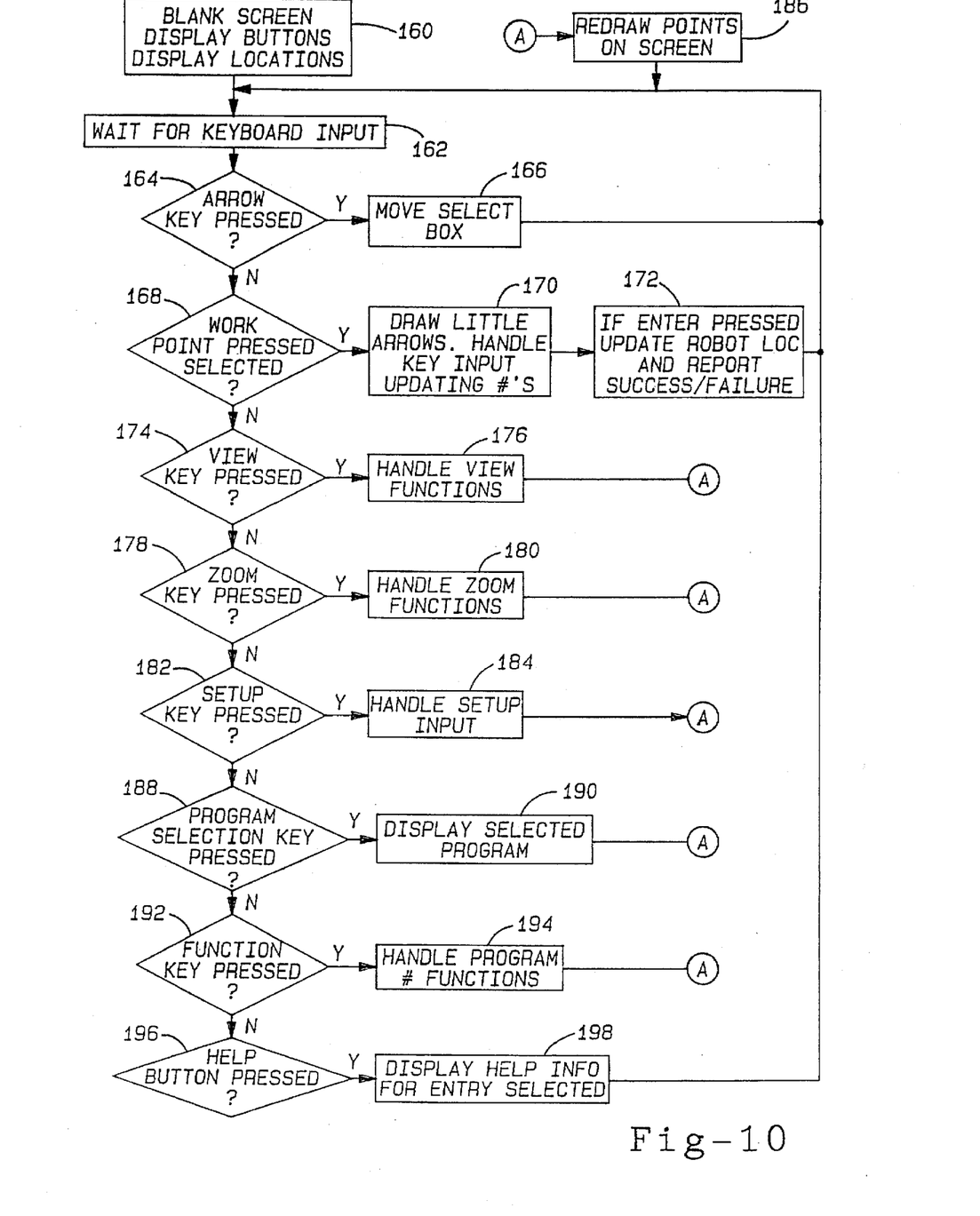
FIG. 10 is a flow diagram of to work point adjustment control system.

FIG. 10 depicts a flow diagram of the operation of the robot work point adjustment control system 158. The flow diagram starts at block 160 which displays on screen 90 function keys F1–F10, control panel 94, and work points 98 which are selected in accordance with the body style displayed on the screen when the control system was last exited. After this information has been displayed, the control system waits for keyboard input as shown at block 162. A series of tests are then performed to determine which function the control system should execute. At block 164, the control system determines if an arrow key has been pressed. If so, control proceeds to block 166 where the select box is moved in accordance with the particular arrow key pressed. If not, control proceeds to block 168. At block 168, the control system determines if a particular point has been selected for movement by designating with cursor 104a and pressing ENTER. If a point has been selected (98b', for example), the work point is highlighted as shown in FIG. 6. At block 170, coordinate system is drawn around the selected point, and any arrow key input following selection of the point displaces the selected work point in a direction of the arrow by a factor of one millimeter per arrow pressed. As shown at block 172, if ENTER is pressed, the robot is updated and a message may be returned back to the message line 100. If escape (ESC) is pressed, the point adjustment mode is exited with no changes to the position of the selected point. If no work point is selected, the control system proceeds to block 174 where a test is executed to determine if a view selection button (i.e., top, side, or rear) in control panel 94 has been activated. If a view selection key has been activated, the control program proceeds to block 176 where the selected view is displayed in display 92 and to block 186 where points are redrawn on the screen. If no view selection key has been activated, control proceeds to block 178 to test whether a zoom key has been activated. If a zoom key has been activated, the resultant zoom function is executed at block 180, and the points are redrawn on the screen as shown at block 186. If no zoom key has been activated, control proceeds to block 182 where a test is performed to see if the SETUP key has been executed. If the SETUP key has been executed, control proceeds to block 184 which displays the SETUP screen as depicted in FIG. 8. At block 184 the control system associates the registers in memory 76 of robot controller 64 with a particular body style. Control then proceeds to block 186 where the display screen is redrawn after the operator exits the setup mode. Returning to block 182 if the setup key has not been activated, control proceeds to block 188 where the control system determines if the operator has selected a different program name by activating either of the NEXT PROGRAM button 140, PREVIOUS PROGRAM button 142, or BASE PROGRAM button 146. If the operator has activated one of the above-mentioned keys, control proceeds to block 190 which displays the work points of the selected program, and then to block 186 which redraws the points on the screen. If the operator has not activated a program key, control proceeds to block 192 which tests whether one of function keys F1–F10 has been activated by the operator. If the operator has activated one of the function keys F1–F10, control proceeds to block 194 and the desired function is executed, then to block 186 which redraws the points on the screen. If no function key has been activated, control proceeds to block 196 which tests to determine if the help key F1 has been activated. If help key F1 has been activated, control proceeds to block 198 and the appropriate help screen is displayed as shown in FIG. 9. If the help button has not been activated, control then proceeds back to block 162 where the control system waits for user input.

While the above detailed description describes the preferred embodiment of the present invention, it will be understood that the present invention is susceptible to modification, variation and alteration without deviating from the scope and fair meaning of the subjoined claims.

What is claimed is:

1. A control system for adjusting a robot arm positionable at a point in a coordinate system from an initial position to a desired position, comprising:

memory for storing the point;

means for retrieving the point from the memory;

video display means for displaying the point at the initial position;

cursor means coupled to the video display means and movable within the video display means for indicating the point;

selector means coupled to the video display means operable for selecting the point at the initial position, the selected point being indicated by the cursor means;

electronic position adjustor means coupled to the video display means for displacing the selected point on the video imaging device from the initial position to the desired position; and electronic means for determining the displacement of the selected point and calculating a coordinate for the desired position.

2. The control system as defined in claim 1 wherein the memory stores a plurality of points to define a set of points and the set of points is retrieved and displayed on the video display means.

3. The control system as defined in claim 2 wherein the selector means is operable to select a plurality of points of the set for sequential adjustment.

4. The control system as defined in claim 2 wherein the selector selects a plurality of the set of points for adjustment, said plurality being adjusted identically.

5. The control system as defined in claim 2 further comprising a means for displaying values on said video imaging device corresponding to the displacement within the coordinate system of the point from the initial position to the desired position.

6. The control system as defined in claim 2 further comprising a means for magnifying an area surrounding the point to provide improved resolution for adjusting the position of the selected point.

7. The control system of claim 2 wherein the display means displays the coordinates of the selected point.

8. The control system of claim 2 further comprising means for storing said calculated coordinate in said memory.

9. The control system of claim 2 wherein the display means displays the points in a selected one of a plurality of selectable views.

10. The control system as defined in claim 2 further comprising a robot controller for generating control signals to control the movement of the robot, the robot controller retrieving points from memory and advancing the robot to the points.

11. A method for adjusting a robot arm positionable at a point in a coordinate system from an initial position to a desired position, comprising:

retrieving from memory a point to be adjusted;

displaying the point at the initial position;

indicating the point on a video display through the use of a pointer;

selecting the point at the initial position, the selected point being indicated by the pointer;

displacing the selected point on the video imaging device from the initial position to the desired position; and determining a displacement of the selected point and calculating a coordinate for the desired position.

12. The method as defined in claim 11 further comprising the step of storing a plurality of points to define a set of points and retrieving and displaying the set of points on the video display means.

13. The method as defined in claim 12 further comprising the step of sequentially adjusting more than a plurality of points of the set.

14. The method as defined in claim 12 further comprising the step of selecting for adjustment a plurality of points of the set of points, said plurality of points being displaced identically.

15. The method as defined in claim 12 further comprising the step of displaying values on said video imaging device corresponding to the displacement within the coordinate system of the point from the initial position to the desired position.

16. The method as defined in claim 12 further comprising the step of magnifying the area surrounding a selected point to provide improved resolution for adjusting the position of the selected point.

17. The method as defined in claim 12 further comprising the step of displaying the coordinates of a selected point on the video display means.

18. The method as defined in claim 12 further comprising the step of storing said calculated coordinate in said memory.

19. The method as defined in claim 12 further comprising the step of displaying the points in one of a plurality of selectable views.

* * * * *